US012709244B1

(12) United States Patent
Craig et al.

(10) Patent No.: US 12,709,244 B1
(45) Date of Patent: Aug. 18, 2026

(54) VEHICLE NETWORK SYSTEMS AND METHODS

(71) Applicant: United Services Automobile Association (USAA), San Antonio, TX (US)

(72) Inventors: Sean Michael Wayne Craig, San Antonio, TX (US); Mounica Urity, Mountain View, CA (US); Matthew Robert Byrd, Boerne, TX (US); Noe Alberto Martinez, San Antonio, TX (US); Daniel Nathan Kalinoski, San Antonio, TX (US); Gregory David Hansen, Fuquay Varina, NC (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/620,457

(22) Filed: Mar. 28, 2024

Related U.S. Application Data

(60) Provisional application No. 63/455,834, filed on Mar. 30, 2023.

(51) Int. Cl.
*B60R 25/102* (2013.01)
*B60Q 1/50* (2006.01)
*B60Q 5/00* (2006.01)
*G06Q 40/08* (2012.01)

(52) U.S. Cl.
CPC ............ *B60R 25/102* (2013.01); *B60Q 1/507* (2022.05); *B60Q 5/005* (2013.01); *G06Q 40/08* (2013.01)

(58) Field of Classification Search
CPC ............. B60R 25/102; B60R 25/1012; B60R 2025/1016; G06Q 40/08
See application file for complete search history.

(56) References Cited

U.S. PATENT DOCUMENTS

| | | | | |
|---|---|---|---|---|
| 12,185,133 | B1 * | 12/2024 | Smith | H04W 24/02 |
| 2014/0278583 | A1 * | 9/2014 | Brown | G06Q 40/08 705/4 |
| 2017/0240062 | A1 * | 8/2017 | Jaiswal | B60L 53/66 |
| 2019/0113915 | A1 * | 4/2019 | Laur | B60W 60/00259 |
| 2021/0129793 | A1 * | 5/2021 | Murray | G08G 1/16 |

* cited by examiner

*Primary Examiner* — Erin D Bishop
*Assistant Examiner* — Alex B Griffin
(74) *Attorney, Agent, or Firm* — Fletcher Yoder, P.C.

(57) ABSTRACT

A vehicle network system includes one or more processors and a memory storing instructions executable by the vehicle network system to cause the vehicle network system to identify presence of a first vehicle in a geographic area, identify a number of assets in the geographic area, and in response to the number of assets in the geographic area exceeding a threshold, control the first vehicle to autonomously move through the geographic area.

19 Claims, 4 Drawing Sheets

VEHICLE NETWORK SYSTEMS AND METHODS

CROSS-REFERENCE TO RELATED APPLICATION

The present application claims priority to and the benefit of U.S. Provisional Application No. 63/455,834, entitled "VEHICLE NETWORK SYSTEMS AND METHODS" and filed Mar. 30, 2023, the disclosure of which is incorporated by reference herein in its entirety for all purposes.

BACKGROUND

The present disclosure relates generally to vehicle network systems and methods, and more particularly, to vehicle network systems and methods that operate teams of vehicles to detect and/or respond to events (e.g., weather events, social events, crime events, vehicle crash events, unusual activity, fire events, smoke events, loud sounds) in a geographic area (e.g., a neighborhood, a parking lot).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles may include communication devices that enable wireless communication with other devices and systems. For example, a vehicle may include a communication device that wirelessly communicates with a navigation system to receive a suggested driving route to a destination, and the vehicle may then display the suggested driving route on a display screen of the vehicle.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a vehicle network system includes one or more processors and a memory storing instructions executable by the vehicle network system to cause the vehicle network system to identify presence of a first vehicle in a geographic area, identify a number of assets in the geographic area, and in response to the number of assets in the geographic area exceeding a threshold, control the first vehicle to autonomously move through the geographic area.

In certain embodiments, a vehicle network system includes one or more processors and a memory storing instructions executable by the vehicle network system to cause the vehicle network system to identify presence of a first vehicle and a second vehicle in a geographic area, and in response to detecting an event in the geographic area, instruct at least one of a first alert system of the first vehicle and a second alert system of the second vehicle to provide an alert.

In certain embodiments, a method of operating a vehicle network system includes identifying, using one or more processors, presence of a first vehicle in a geographic area. The method also includes identifying, using the one or more processors, a number of assets in the geographic area. The method further includes instructing, using the one or more processors, the first vehicle to autonomously move through the geographic area, in response to the number of assets in the geographic area exceeding a threshold.

BRIEF DESCRIPTION OF THE DRAWINGS

Various aspects of this disclosure may be better understood upon reading the following detailed description and upon reference to the drawings in which.

DETAILED DESCRIPTION

Figure 1:
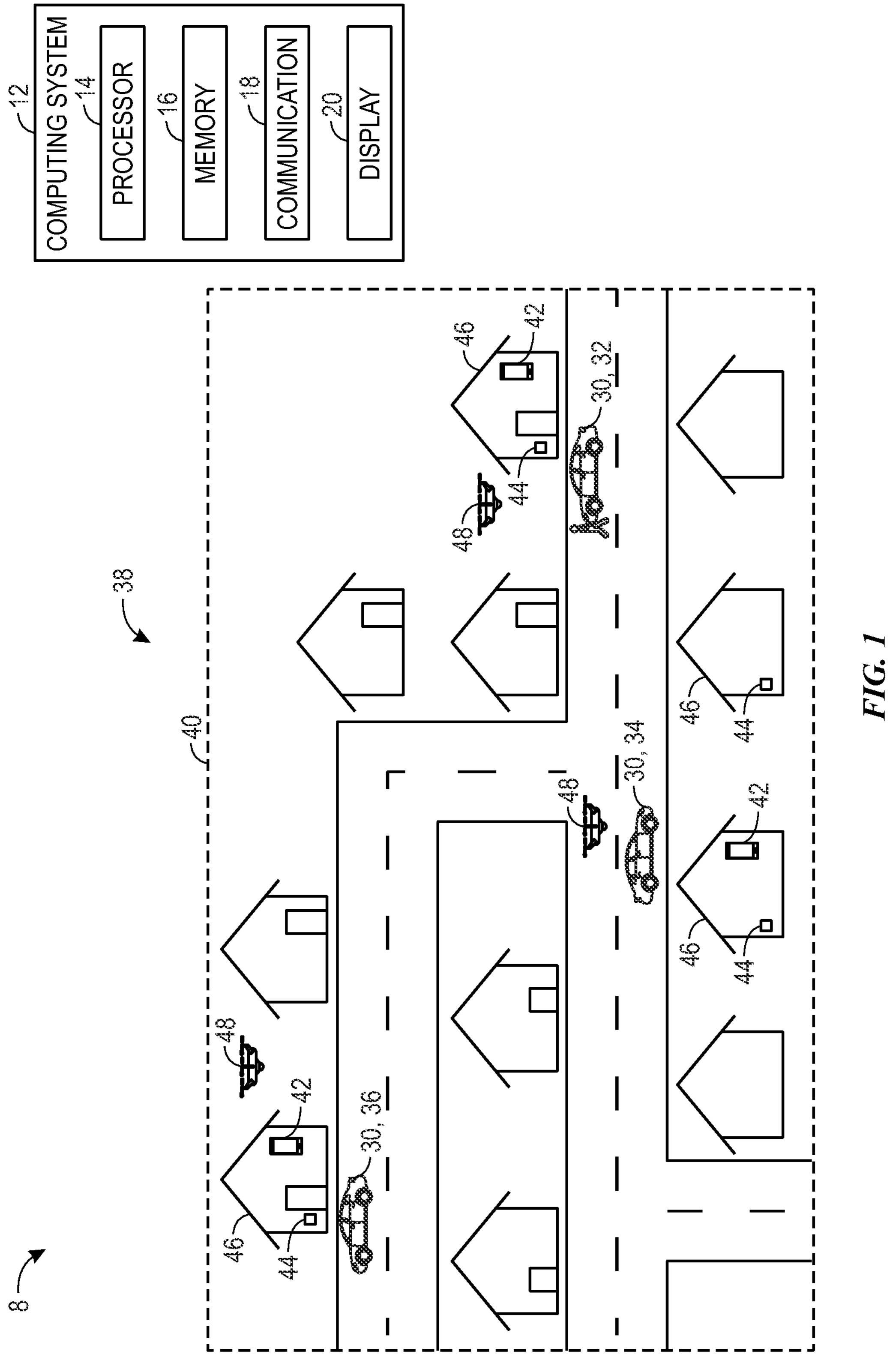
FIG. 1 illustrates a vehicle network system for a geographic area that includes a neighborhood, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure the articles "a," "an," "the," and "said" are intended to mean that there are one or more of the elements. The terms "comprising," "including," and "having" are intended to be inclusive and mean that there may be additional elements other than the listed elements. It should be noted that the terms "activity level" and "state" may be used interchangeably herein.

It is presently recognized that it may be desirable to create vehicle networks with vehicles that are configured to wirelessly communicate with one another and/or with other devices and systems. The vehicles may wirelessly communicate directly with one another (e.g., via wireless mesh networks) and/or indirectly with one another (e.g., via a computing system and the Internet). The vehicles may be configured to monitor activity in a geographic area, provide alerts in response to events in the geographic area, and so forth. For example, a first vehicle may include a sensor configured to detect a break-in at the first vehicle. Upon detection of the break-in at the first vehicle, the first vehicle may directly or indirectly communicate occurrence of the break-in to other vehicles. Then, the other vehicles may be instructed to flash lights, activate horns (or other sound devices, such as a speakers), and so forth.

Advantageously, some or all of the vehicles may be autonomous vehicles. In such cases, the autonomous vehicles may be controlled to travel through the geographic area in a coordinated manner to facilitate detection of the events. For example, the first vehicle may be instructed to travel through the geographic area during a first portion of overnight hours, a second vehicle may be instructed to travel through the geographic area during a second portion of overnight hours, and so forth. The second vehicle may include a camera that captures images of an unexpected individual approaching the first vehicle. Then, the second vehicle may communicate occurrence of the unexpected individual approaching the first vehicle to the first vehicle and/or to other vehicles to prompt the response (e.g., lights, horns).

It should be appreciated that the vehicle networks may include and/or communicate with other systems. For example, the vehicle network may include and/or communicate with user devices (e.g., mobile phones) of users associated with the vehicles, building systems (e.g., alarm systems) of residential buildings and/or other buildings associated with and/or within communication range of the vehicles, unmanned aerial vehicles, and so forth.

The vehicles may qualify (e.g., meet criteria; be registered) to participate in one or more of the vehicle networks, such as through a third-party entity (e.g., insurance company that provides insurance for the vehicles, lender that provides financing for the vehicles, emergency services provider that provides emergency services for the vehicles, security provider that provides security services for the vehicles). In response, users associated with the vehicles may receive certain benefits, such as a discount on an insurance policy (e.g., a reduced premium and/or deductible). For example, the first vehicle may qualify to participate in one or more fixed vehicle networks over respective fixed geographic areas, such as one fixed vehicle network over a residential neighborhood with a residential building associated with the first vehicle. Additionally or alternatively, the first vehicle may qualify to participate in one or more dynamic vehicle networks over various geographic areas, such as any geographic area that includes a cluster or other group of vehicles that qualify to participate in the one or more dynamic vehicle networks. Thus, if the first vehicle travels to a parking lot, the first vehicle may join a respective vehicle network that covers the parking lot. Then, the first vehicle may be involved in providing the alerts, the coordinated travel to facilitate detection of any events in the parking lot, and so forth. Thus, if the first vehicle is parked in the parking lot during a break-in at the first vehicle, the other vehicles in the respective vehicle network may flash lights, activate horns, and so forth. If the first vehicle is an autonomous vehicle, the first vehicle may be controlled to travel around the parking lot to monitor activity in the parking lot (e.g., after the first user parks the first vehicle in the parking lot; after the first user exits the vehicle, such as to visit a store or other nearby location).

The vehicle networks may be used to detect a variety events, such as weather events, social events, crime events, vehicle crash events, unusual activity (e.g., a presence of unexpected individuals and/or vehicles), fire events, smoke events, loud sounds, and so forth. The vehicle networks may be used to efficiently and effectively provide the alerts via the vehicles in the vehicle networks and/or other systems, such as the user devices, the building systems, and so forth. The alerts may vary based on characteristics of the events (e.g., a presence of unexpected individuals may prompt a lower level alert, such as a text notification on user devices, while a confirmed break-in to a vehicle or a building may prompt a higher level alert, such as lights, horns, and the text notification).

It is presently recognized that alert systems (e.g., lights, horns) of vehicles are often promptly disabled during break-ins. Thus, the vehicle network that utilizes other surrounding vehicles (and/or other systems) to provide the alerts may deter and/or stop further progression of break-ins. Additionally, it is presently recognized that users may desire to join monitoring groups or teams, either for their own neighborhood or as they travel to different geographic areas. In this way, their vehicles may operate to provide information and/or security for one another. Advantageously, the vehicle networks may operate with certain thresholds and parameters. For example, the vehicle networks may only be created or the vehicles may only be prompted to travel to monitor the geographic area while a threshold number of vehicles are present in the geographic area. This may limit mileage on any particular vehicle and/or activate the vehicle networks only when a benefit provided by travel of one or more of the vehicles outweighs risk. For example, if only one vehicle is present in the geographic area, it may generally be lower risk for the one vehicle to remain parked in a stationary position. The threshold may vary with characteristics (e.g., type, total area, total number of vehicles registered to the fixed geographic area, user preferences, total estimated value of the vehicles and/or other assets in the geographic area) of the geographic area and/or conditions (e.g., weather conditions, crime conditions, time of day) in the geographic area.

With the foregoing in mind, FIG. 1 illustrates a vehicle network system 8 that includes a neighborhood, in accordance with embodiments described herein. The vehicle network system 8 may include a computing system 12, which may include any suitable computing device, such as a general-purpose personal computer, a laptop computer, a tablet computer, a mobile computer, a server, or the like. The computing system 12 may include various types of components that assist the computing system 12 in performing various operations described herein. For example, the computing system 12 may include a processor 14, a memory 16, a communication device 18, and/or a display 20.

The processor 14 may be any type of computer processor or microprocessor capable of executing computer-executable code. The memory 16 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform various techniques disclosed herein. The memory 16 may represent non-transitory computer-readable media (e.g., any suitable form of memory or storage). It should be noted that non-transitory merely indicates that the media is tangible and not a signal. Data (e.g., vehicle information, thresholds) may be stored in one or more databases, which may be accessible to the computing system 12 and/or may be part of the computing system 12 (e.g., within the memory 16).

The communication device 18 may enable the computing system 12 to communicate with other systems (e.g., via a network, such as the Internet; capable of transmitting radio frequency waves). The display 20 may operate as a human machine interface (HMI) to depict visualizations associated with software or executable code being processed by the processor 14. In one embodiment, the display 20 may be a touch display capable of receiving inputs from a user of the computing system 12. The display 20 may be any suitable type of display, such as a liquid crystal display (LCD), plasma display, or an organic light emitting diode (OLED) display, for example. It should be noted that the components described above with regard to the computing system 12 are examples and the computing system 12 may include additional or fewer components. In some embodiments, the computing system 12 may be a distributed computing system that includes multiple processors 14 (e.g., including one or more cloud computing systems having multiple processors 14).

In certain embodiments, the computing system 12 may communicate with and/or be considered to include respective vehicle control systems (e.g., on-board control systems that control steering systems, braking systems, and engine systems) for multiple vehicles 30 of the vehicle network system 8. To facilitate discussion, the vehicle network system 8 of FIG. 1 includes a first vehicle 32, a second vehicle 34, and a third vehicle 36. The vehicles 30 may communicate directly with one another and/or indirectly with one another via the computing system 12. The vehicle network system 8 may include the vehicles 30 within a geographic area 38 defined by a boundary 40. The geographic area 38 may be fixed (e.g., unchanging over time), and the vehicle network system 8 within the geographic area 38 may have a dynamic composition that changes as the vehicles 30 move into and out of the geographic area 38. In some embodiments, the geographic area 38 may be dynamic (e.g., change over time) based on identifying a cluster or group of the vehicles 30, and the boundary 40 may be dynamically placed around the cluster or group of the vehicles 30. For example, while at least two (or three, four, five, or more) vehicles 30 are within a certain distance of one another (e.g., a half mile radius) and/or in communication range of one another (e.g., communicate directly with one another), the vehicles 30 may be considered to form the vehicle network system 8.

The vehicles 30 are wireless communication-enabled vehicles (e.g., capable of transmitting radio frequency waves; have respective communication devices). The vehicles 30 also include lights (e.g., headlights, interior lights), horns or other speakers, sensors (e.g., imaging sensors or cameras, rain sensors, impact sensors), and/or other output and/or monitoring devices. The vehicle network system 8 may include and/or the vehicles 30 may communicate with other systems, such as user devices 42 (e.g., mobile phones), building systems 44 (e.g., security systems) associated with buildings 46 (e.g., residential or commercial buildings), and/or unmanned aerial vehicles 48 (e.g., drones). In some embodiments, the unmanned aerial vehicles 48 may be removably coupled to (e.g., carried by) the vehicles 30. In some embodiments, each vehicle 30 is associated with a respective user (e.g., owner of the vehicle 30), as well as a respective user device 42 (e.g., owned by the user), a respective building system 44 of a respective building (e.g., residence of the user), and/or a respective unmanned aerial vehicle 48 (e.g., removeably coupled or paired with the vehicle 30).

The vehicles 30, the user devices 42, the building systems 44, and/or the unmanned aerial vehicles 48 may be communicatively coupled to one another and/or to the computing system 12. Thus, as long as at least one device or system in the vehicle network system 8 is connected to the computing system 12 and every device or system is connected to at least one other device or system, data associated with each device or system may be transmitted to the computing system 12 for storage and analysis. Further, instructions for each device or system may be transmitted to each device or system, and instructions to the vehicles 30 (e.g., to the respective vehicle control systems) may cause the vehicles 30 to move (e.g., drive) and/or carry out other actions (e.g., provide outputs, such as alerts, lights, sounds) in accordance with the instructions.

The vehicles 30 in the vehicle network system 8 may form a team to monitor the geographic area 38 for occurrence of events (e.g., vehicle collisions, break-ins to vehicles and/or buildings, usual activity) and/or respond to the occurrence of the events. For example, an alert system (e.g., lights, horn) of the first vehicle 32 may be promptly disabled upon a break-in. However, the first vehicle 32 may communicate an indication of occurrence of the break-in, which may cause the second vehicle 34 and/or the third vehicle 36 to provide alerts (e.g., flashing lights, horns) with their alert systems to draw attention to and/or deter the break-in. Further, the second vehicle 34 and the third vehicle 36 may activate their own monitoring devices (e.g., cameras, microphones). Further, the second vehicle 34 and the third vehicle 36 may provide the alerts and/or activate their own monitoring devices while moving or while stationary (e.g., parked) and/or while occupied or unoccupied (e.g., driving under control of the user; driving autonomously; with engine shut off and users not in the vehicles 30).

In some embodiments, the other systems in the vehicle network system 8 may also provide the alerts. For example, any of the user devices 42 may provide the alerts (e.g., text notifications, including push notification even while the user devices 42 are in a "silent" or "do not disturb mode"), activate their own monitoring devices (e.g., cameras, microphones), and so forth. Additionally or alternatively, any of the building systems 44 may provide the alerts (e.g., flashing lights, sounds), activate their own monitoring devices (e.g., cameras, microphones), and so forth. Additionally or alternatively, the unmanned aerial vehicles 48 may activate and/or launch to travel toward the event, such as toward the break-in at the first vehicle 32. The unmanned aerial vehicles 48 may provide the alerts (e.g., flashing lights, sounds), activate their own monitoring devices (e.g., cameras, microphones) to capture images and/or sounds of the event (or area near the event), and so forth. The computing system 12 may be used to aggregate and process the data collected from the vehicles 30 and/or the other systems in the vehicle network system 8. Processing the data may involve determining an occurrence of an event, such as the break-in at the first vehicle 32. and determining an appropriate response to the event.

In some embodiments, one or more of the vehicles 30 may be autonomous vehicles. In such cases, the autonomous vehicles may be controlled to travel through the geographic area 38 in a coordinated manner to facilitate detection of events and/or to deter certain types of events (e.g., break-ins). The vehicle network system 8 may coordinate operation of the vehicles 30 to monitor the geographic area 38 in any of a variety of ways. For example, the first vehicle 32, the second vehicle 34, and the third vehicle 36 may be registered to the geographic area 38 (e.g., frequently within the geographic area 38; parked regularly at certain times within the geographic area 38; owners of the vehicles 30 reside in the geographic area 38). In such cases, the computing system 12 may detect that the first vehicle 32, the second vehicle 34, and the third vehicle 36 are all present in the geographic area (e.g., all parked as of 10:00 μm), and then the computing system 12 may initiate a monitoring program for the geographic area 38 (e.g., according to a schedule). For example, the computing system 12 may instruct the first vehicle 32 to travel through the geographic area 38 over a first portion of overnight hours, the second vehicle 34 to travel through the geographic area 38 over a second portion of the overnight hours, and the third vehicle 36 to travel through the geographic area 38 over a third portion of the overnight hours. In this way, the vehicle network system 8 may utilize the vehicles 30 to patrol or to monitor the geographic area 38 (e.g., take turns traveling through the geographic area 38; sequentially or at different times).

In some embodiments, the computing system 12 may implement a standard monitoring program (e.g., recurring, such as every night or every weeknight) for the geographic area 38 unless the computing system 12 receives inputs that indicate that adjustments should be made to the standard monitoring program. For example, if one of the vehicles 30 that is typically present during the overnight hours in the geographic area 38 is not present at a particular time to initiate the standard monitoring program, the computing system 12 may determine not to initiate the standard monitoring program (e.g., due to less than a threshold number of vehicles) or may adjust the standard monitoring program accordingly (e.g., the second vehicle 34 may travel during the first portion of the overnight hours and the second portion of the overnight hours).

It should be appreciated that the computing system 12 may account for other inputs to adjust the standard monitoring program and/or to dynamically create the monitoring program. The inputs may include inputs from the users associated with the vehicles 30 that indicate that the users expect (or do not expect) the vehicles 30 to remain in the geographic area 38 for some period of time (e.g., the overnight hours, 2 hours, 4 hours; provided by the users each time they park the vehicles 30), inputs from the users associated with the vehicles 30 to register the vehicles 30 to participate in certain monitoring hours in certain locations (e.g., the overnight hours every night in the geographic area 38), and/or inputs from historical data (and/or modeled data and/or machine learning algorithms) that indicates that the vehicles 30 are likely to be available in the geographic area 38 for some period of time (e.g., the overnight hours every night in the geographic area 38 over the last year). For example, upon detecting that the vehicle 30 is parked in the geographic area 38 or at any other suitable time, the computing system 12 may instruct display of a prompt on a display screen of the vehicle 30 and/or the user device 42 to request the input from the user that indicates a length of time that the user expects the vehicle 30 to remain in the geographic area 38 (e.g., available for the monitoring program).

It should also be appreciated that more than one of the vehicles 30 may be controlled to travel through the geographic area 38 at the same time (e.g., overlapping or identical time periods; through separate or same portions of the geographic area 38). The number of vehicles 30 that travel through the geographic area 38 may vary based on certain factors, such as characteristics (e.g., type, total area, total number of vehicles registered to the fixed geographic area, user preferences, total estimated value of the vehicles and/or other assets in the geographic area) of the geographic area 38 and/or conditions (e.g., weather conditions, crime conditions, time of day) in the geographic area 38. For example, the monitoring program may assign only one of the vehicles 30 to autonomously travel about the geographic area 38 at any given time during daytime hours, but two of the vehicles 30 to autonomously travel about the geographic area 38 at any given time during the overnight hours. Thus, the computing system 12 may assess certain factors to determine and/or employ the monitoring program for the geographic area 38, which may include determining an appropriate number of vehicles 30 to travel through the geographic area 38 and/or routes and timing for each of the vehicles 30.

In some embodiments, the computing system 12 may provide instructions to autonomously move (e.g., drive) the vehicles 30 (e.g., via the respective vehicle control systems) around the geographic area 38 as long as or while there are a threshold number of vehicles 30 within the geographic area 38. The threshold may vary with characteristics (e.g., type, total area, total number of vehicles registered to the fixed geographic area, user preferences, total estimated value of the vehicles and/or other assets in the geographic area) of the geographic area and/or conditions (e.g., weather conditions, crime conditions, time of day) in the geographic area. In some embodiments, the threshold may be set as 2, 3, 4, 5, 6, 7, 8, 9, 10, or any suitable number vehicles 30 in the geographic area 38.

It should be appreciated that variations are envisioned. For example, the computing system 12 may provide the instructions to autonomously move the vehicles 30 around the geographic area 38 as long as or while there are a threshold number of vehicles 30 and/or other assets (e.g., residential buildings) within the geographic area 38. In some embodiments, the threshold may be set as 2, 3, 4, 5, 6, 7, 8, 9, 10, or any suitable number of vehicles 30 and/or other assets in the geographic area 38. For example, even if the second vehicle 34 is not in the geographic area 38 (e.g., due to being in a repair shop), the computing system 12 may proceed to control the first vehicle 32 and the third vehicle 36 to move through the geographic area 38 during the overnight hours because the residence of the user associated with the second vehicle 34 satisfies the threshold (e.g., a threshold of 5 total assets; qualified assets, such as assets insured by an insurance company). In some cases, a presence of the user devices 42 of the users associated with the vehicles 30 (which may also indicate presence of the users) within the geographic area 38 may also be counted toward the threshold (e.g., each user device 42 counts as one of the assets).

In some embodiments, only the vehicles 30 that qualify to participate in the vehicle network system 8 (e.g., via meeting criteria; registration), the user devices 42 associated with such vehicles 30 or otherwise qualified to be counted as an asset in the vehicle network system 8, and/or the buildings 46 associated with such vehicles 30 or otherwise qualified to be counted as an asset in the vehicle network system 8 are counted toward the threshold. However, it should be appreciated that other assets (e.g., other vehicles, user devices, and/or buildings) may also be counted toward the threshold. In this way, the vehicle network system 8 may provide monitoring services to assist neighbors and/or develop good will among neighbors, for example. Further, the threshold may be a number of assets or may be a total value (e.g., estimated dollar value) of assets. In this way, the vehicle network system 8 may be monitor the geographic area 38 when the vehicles 30 in the geographic area 38 include valuable vehicles 30 that would be expensive to repair and/or replace.

Figure 2:
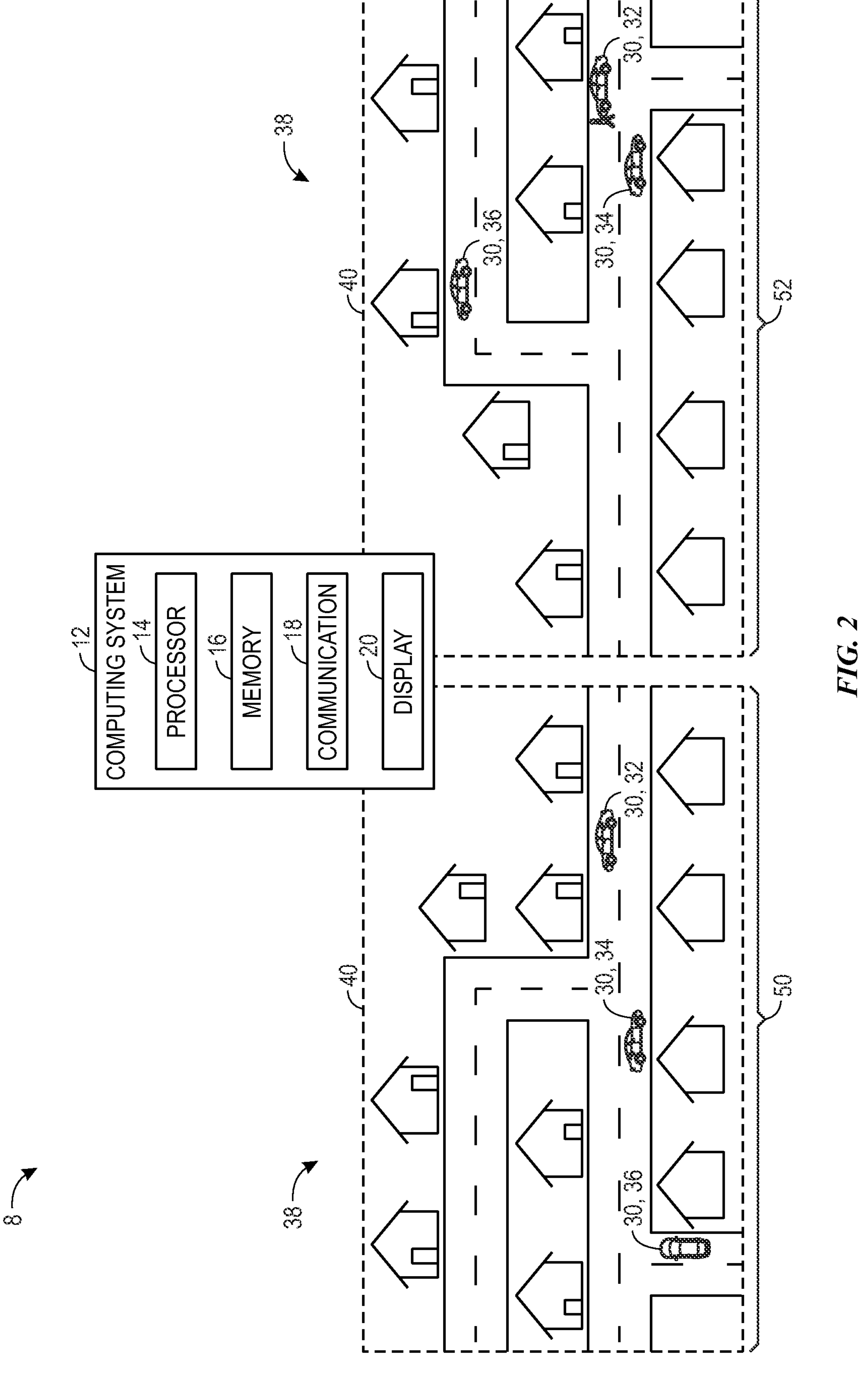
FIG. 2 illustrates the vehicle network system of FIG. 1, wherein an autonomous vehicle is controlled to move and collect data in the geographic area, in accordance with embodiments described herein.

FIG. 2 illustrates the vehicle network system 8 that includes the neighborhood, wherein the second vehicle 34 travels to monitor the neighborhood over a first time period referenced in a first portion 50 of FIG. 2 and then the third vehicle 36 travels to monitor the neighborhood over a second time period referenced in a second portion 52 of FIG. 2, in accordance with embodiments described herein. As shown, the second vehicle 34 may be instructed and controlled to travel along roads through the neighborhood over the first time period (e.g., the second portion of the overnight hours). Then, the third vehicle 36 may be instructed and controlled to travel along roads through the neighborhood over the second time period (e.g., the third portion of the overnight hours).

Thus, the vehicles 30 in the vehicle network system 8 may form a team to monitor the geographic area 38 for occurrence of events (e.g., vehicle collisions, break-ins) and/or respond to the occurrence of the events. For example, an alert system (e.g., lights, horn) of the first vehicle 32 may be promptly disabled upon a break-in. However, the third vehicle 36 may detect occurrence of the break-in at the first vehicle 32 and/or other event (e.g., weather events, social events, crime events, vehicle crash events, unusual activity, such as a presence of unexpected individuals and/or vehicles, fire events, smoke events, loud sounds). Then, the third vehicle 36 may communicate an indication of the occurrence of the break-in and/or the other event, which may cause the first vehicle 32 (to the extent the first vehicle 32 is capable), the second vehicle 34, and/or the third vehicle 36 to provide alerts (e.g., flashing lights, horns) with their alert systems. Further, the second vehicle 34 and the third vehicle 36 may activate their own monitoring devices (e.g., cameras, microphones). In some embodiments, the other systems in the vehicle network system 8 may also provide the alerts and/or activate their own monitoring devices, as described with reference to FIG. 1.

Figure 3:
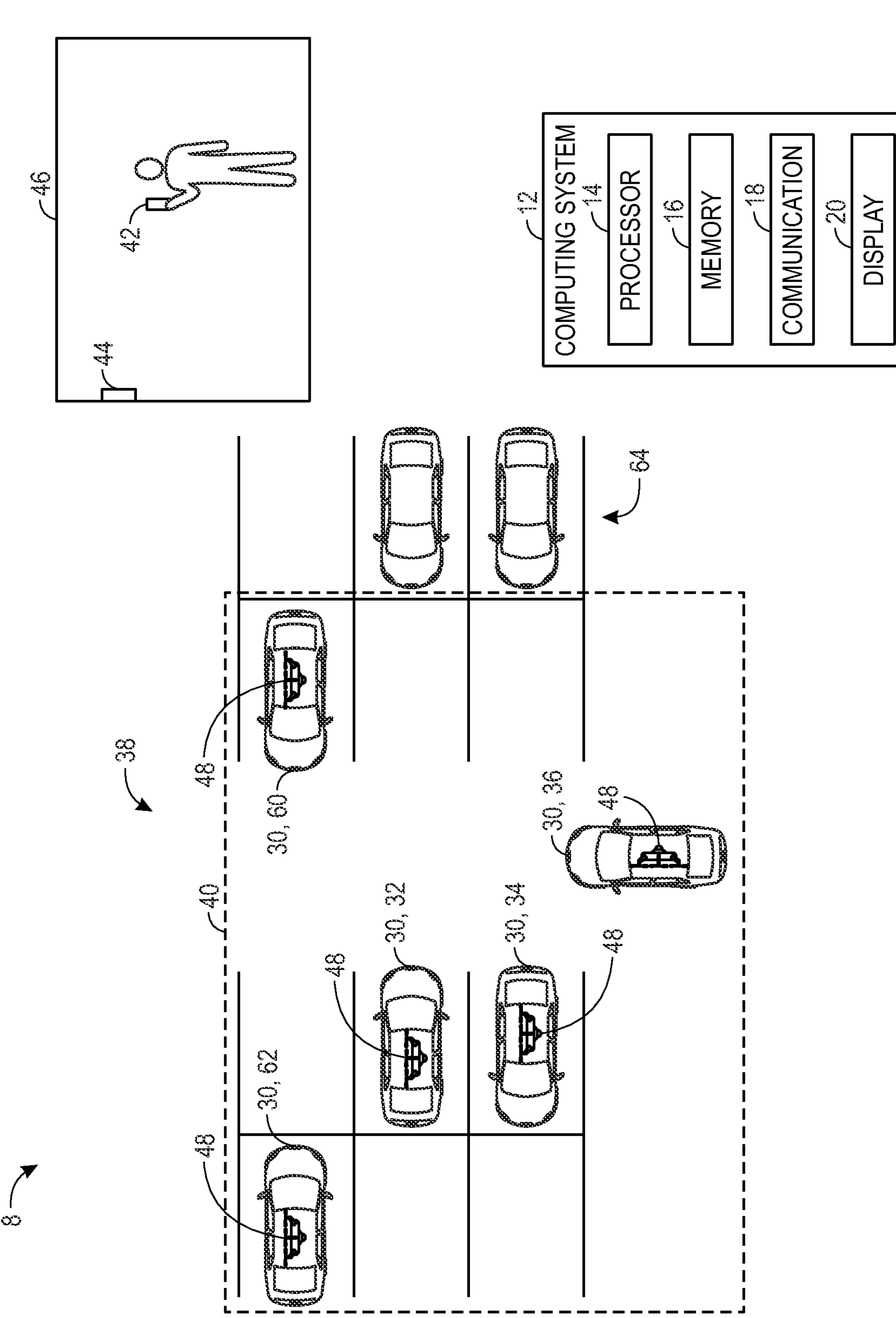
FIG. 3 illustrates a vehicle network system for a geographic area that includes a parking lot, in accordance with embodiments described herein.

FIG. 3 illustrates the vehicle network system 8 that includes a parking lot, in accordance with embodiments described herein. The vehicle network system 8 includes multiple vehicles 30. To facilitate discussion, the vehicle network system 8 of FIG. 1 includes the first vehicle 32, the second vehicle 34, the third vehicle 36, a fourth vehicle 60, and a fifth vehicle 62. The vehicles 30 may communicate directly with one another and/or indirectly with one another via the computing system 12. The vehicle network system 8 may include the vehicles 30 within the geographic area 38 defined by the boundary 40. The geographic area 38 may be fixed (e.g., unchanging over time), and the vehicle network system 8 within the geographic area 38 may have a dynamic composition that changes as the vehicles 30 move into and out of the geographic area 38. In some embodiments, the geographic area 38 may be dynamic (e.g., change over time) based on identifying a cluster or group of the vehicles 30, and the boundary 40 may be dynamically placed around the cluster or group of the vehicles 30. For example, in FIG. 3, the boundary 40 of the geographic area 38 excludes a portion 64 of the parking lot, as the portion 64 of the parking lot does not include any of the vehicles 30 that qualify for the vehicle network system 8.

As discussed herein, the vehicles 30 are wireless communication-enabled vehicles (e.g., capable of transmitting radio frequency waves; have respective communication devices). The vehicles 30 also include lights (e.g., headlights, interior lights), horns or other speakers, sensors (e.g., imaging sensors or cameras, rain sensors, impact sensors), and/or other output and/or monitoring devices. The vehicle network system 8 may include and/or the vehicles 30 may communicate with other systems, such as the user devices 42 (e.g., mobile phones), the building systems 44 (e.g., security systems) associated with the buildings 46 (e.g., commercial buildings, such as a grocery store), and/or the unmanned aerial vehicles 48 (e.g., drones). In some embodiments, the unmanned aerial vehicles 48 may be removably coupled to (e.g., carried by) the vehicles 30. The vehicles 30, the user devices 42, the building systems 44, and/or the unmanned aerial vehicles 48 may be communicatively coupled to one another and/or to the computing system 12.

The vehicles 30 in the vehicle network system 8 may form a team to monitor the geographic area 38 for occurrence of events (e.g., vehicle collisions, break-ins) and/or respond to the occurrence of the events. For example, an alert system (e.g., lights, horn) of the first vehicle 32 may be promptly disabled upon a break-in. However, the first vehicle 32 may communicate an indication of occurrence of the break-in, which may cause the second vehicle 34, the third vehicle 36, the fourth vehicle 60, and the fifth vehicle 62 to provide alerts (e.g., flashing lights, horns) with their alert systems and/or to activate their own monitoring devices (e.g., cameras, microphones).

In some embodiments, the other systems in the vehicle network system 8 may also provide the alerts. For example, any of the user devices 42 may provide the alerts (e.g., text notifications, including push notification even while the user devices 42 are in a "silent" or "do not disturb mode"), activate their own monitoring devices (e.g., cameras, microphones), and so forth. Additionally or alternatively, any of the building systems 44 may provide the alerts (e.g., flashing lights, sounds), activate their own monitoring devices (e.g., cameras, microphones), and so forth. Additionally or alternatively, the unmanned aerial vehicles 48 may activate and/or launch to travel toward the event, such as toward the break-in at the first vehicle 32. The unmanned aerial vehicles 48 may provide the alerts (e.g., flashing lights, sounds), activate their own monitoring devices (e.g., cameras, microphones) to capture images and/or sounds of the event (or area near the event), and so forth. The computing system 12 may be used to aggregate and process the data collected from the vehicles 30 and/or the other systems in the vehicle network system 8. Processing the data may involve determining an occurrence of an event, such as the break-in at the first vehicle 32 and determining an appropriate response to the event. In some embodiments, only select vehicles 30 and/or other systems may provide the alerts and/or activate their own monitoring devices, such as only the select vehicles 30 in parking spaces that are adjacent to the first vehicle 32 and/or within some range of the first vehicle 32 (e.g., based on respective global positioning sensor coordinates, signal strength, or other position indicators).

In some embodiments, one or more of the vehicles 30 may be autonomous vehicles. In such cases, the autonomous vehicles may be controlled to travel through the geographic area 38 in a coordinated manner to facilitate detection of events and/or to deter certain types of events (e.g., break-ins). The vehicle network system 8 may coordinate operation of the vehicles 30 to monitor the geographic area 38 in any of a variety of ways. For example, the vehicles 30 may be qualified to join the vehicle network system 8, and the computing system 12 may continuously, periodically, and/or responsively (e.g., in response to each entry, exit, and/or parking of each qualified vehicle 30 at the parking lot) determine whether to carry out a monitoring program within the geographic area 38.

In some embodiments, the computing system 12 may count a number of the vehicles 30 in the parking lot. In response to the number of the vehicles 30 in the parking lot exceeding a threshold, the computing system 12 may instruct the vehicles 30 to travel through the parking lot to carry out the monitoring program (e.g., according to a schedule). For example, the computing system 12 may instruct the vehicles 30 to take turns moving through the geographic area 38 to patrol the parking lot. In some cases, after being parked in one of the parking spaces in the parking lot, each vehicle 30 may be assigned a time period to autonomously move through the geographic area 38, such as a 10 minute time period. In some embodiments, as long as the number of vehicles 30 in the parking lot remains above the threshold, the vehicles 30 may continue to take turns moving through the geographic area 38 until the users remove or request to remove their vehicles 30 from the parking lot (e.g., the users leave the grocery store and want to use their vehicles 30 to travel to other locations).

In some embodiments, the computing system 12 may implement a standard monitoring program (e.g., each of the vehicles 30 takes turns to drive for 10 minutes) for the geographic area 38 unless the computing system 12 receives inputs that indicate that adjustments should be made to the standard monitoring program. For example, if only one of the vehicles 30 is present in the parking lot at a particular time, the computing system 12 may determine not to initiate the standard monitoring program (e.g., due to less than a threshold number of vehicles). Further, if all of the vehicles 30 are in adjacent or nearby parking spaces, the computing system 12 may determine not to move any of the vehicles 30 through the geographic area 38. Further, the computing system 12 may instruct the vehicles 30 to move to be in adjacent or nearby parking spaces (e.g., to form a cluster or group) to limit movement through the parking lot, while also enabling the vehicles 30 to provide alerts and/or monitoring services for one another.

As noted herein, it should be appreciated that the computing system 12 may account for other inputs to adjust the standard monitoring program and/or to dynamically create the monitoring program. It should also be appreciated that more than one of the vehicles 30 may be controlled to travel through the geographic area 38 at the same time (e.g., overlapping or identical time periods; through separate or same portions of the geographic area 38). Additionally, as noted herein, the computing system 12 may provide instructions to autonomously move the vehicles 30 around the geographic area 38 as long as or while there are a threshold number of vehicles 30 and/or other assets within the geographic area 38. The threshold may vary with characteristics (e.g., type, total area, user preferences, total estimated value of the vehicles and/or other assets in the geographic area) of the geographic area and/or conditions (e.g., weather conditions, crime conditions, time of day) in the geographic area. In some embodiments, the threshold may be set as 2, 3, 4, 5, 6, 7, 8, 9, 10, or any suitable number vehicles 30 and/or other assets within the geographic area 38. Further, the threshold may be a number of assets or may be a total value (e.g., estimated dollar value) of assets. In this way, the vehicle network system 8 may be monitor the geographic area 38 when the vehicles 30 in the geographic area 38 include valuable vehicles 30 that would be expensive to repair and/or replace.

In some embodiments, the users associated with the vehicles 30 may receive certain benefits, such as a discount on an insurance policy (e.g., a reduced premium and/or deductible), in exchange for registration to participate in the vehicle network system 8. In some embodiments, the users may receive the certain benefits and/or additional benefits, such as an additional discount on the insurance policy, in response to participation in the vehicle network system 8 to provide the alerts and/or to autonomously travel through the geographic area 38. It should be appreciated that the users may register or otherwise qualify to participate in the vehicle network system 8 in any of a variety of ways, such as by simply obtaining the insurance policy for the vehicles 30, by submitting a request form, by selecting an option to participate via their user devices 42 or other user interfaces in the vehicles 30 each time the vehicles 30 are parked, and so forth.

Figure 4:
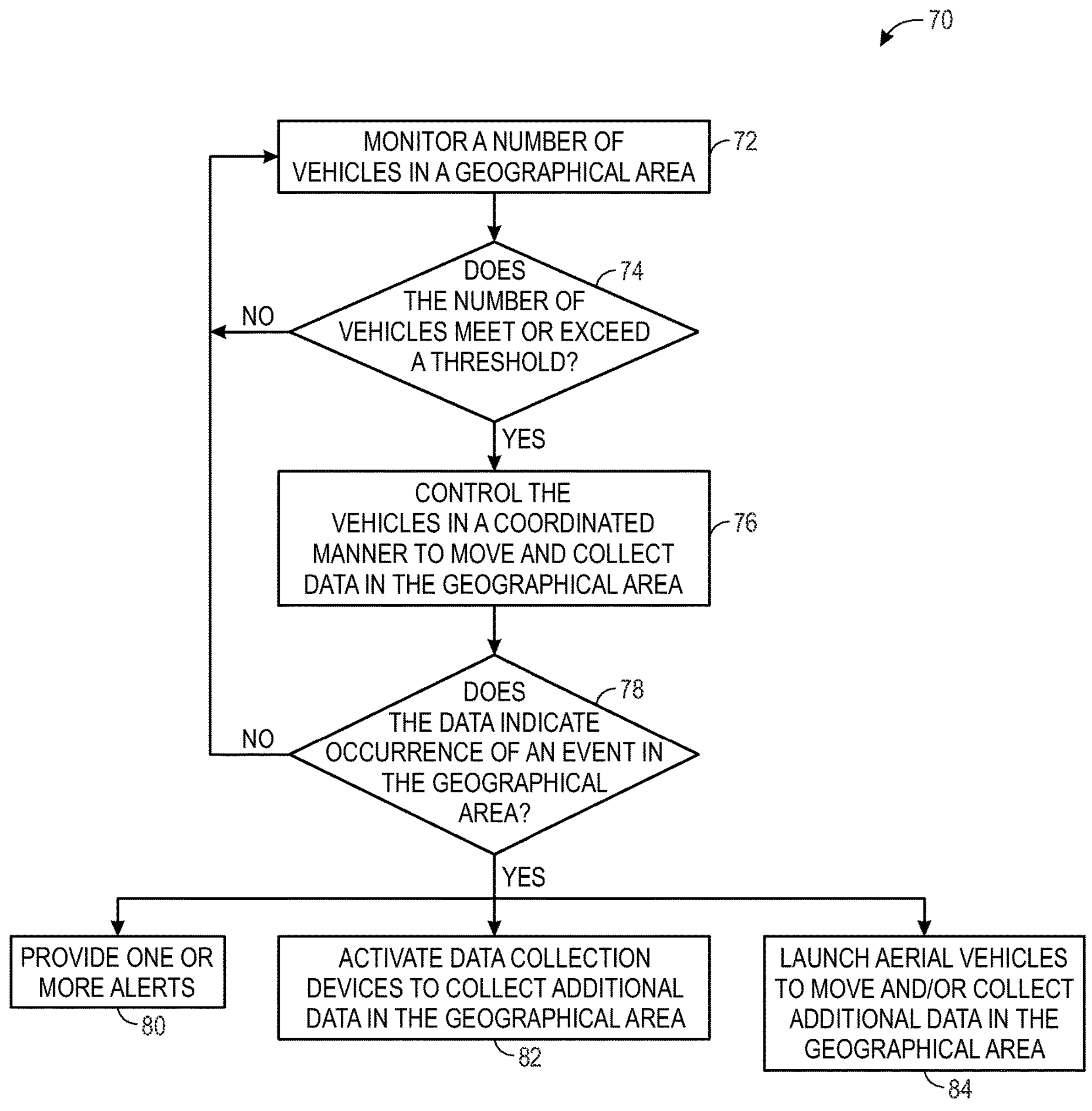
FIG. 4 is a flow chart of a process of operating a vehicle network system in a geographic area, in accordance with embodiments described herein.

FIG. 4 is a flow chart of a process 70 for operating a vehicle network system, such as the vehicle network systems 8 of FIGS. 1-3, in accordance with embodiments described herein. The goal of the process 70 is identify and/or create a boundary that defines a geographic area, and then to control multiple vehicles in the geographic area to operate as a team to monitor the geographic area. The following description of the process 70 will be described as being performed by a computing system, such as the computing system 12 of FIGS. 1-3, but it should be noted that any suitable processor-based device may be specially programmed to perform any of the steps of the process 70 described herein. Moreover, although the following description of the process 70 is described in a particular order, it should be understood that the steps of the process 70 may be performed in any suitable order, certain steps of the process 70 may be omitted, and other steps may be added to the process 70.

The process 70 may begin with monitoring a number of vehicles in a geographic area (block 72). For example, a computing system may receive position information (e.g., respective global position coordinates) for each of the vehicles, as well as access and/or determine a boundary of the geographic area. Then, the computing system may determine the number of the vehicles in the geographic area (e.g., fixed or dynamic geographic area).

The process 70 may continue to compare the number of vehicles to a threshold (block 74). If the number of vehicles is below the threshold, the process 70 may continue to monitor the number of vehicles in the geographic area. However, while the number of vehicles meets or exceeds the threshold, the computing system may initiate a monitoring program and control the vehicles in a coordinated manner to move and collect data in the geographic area (block 76).

As noted herein, the threshold may vary with characteristics (e.g., type, total area, user preferences, total estimated value of the vehicles and/or other assets in the geographic area) of the geographic area and/or conditions (e.g., weather conditions, crime conditions, time of day) in the geographic area. In some embodiments, the threshold may be set as 2, 3, 4, 5, 6, 7, 8, 9, 10, or any suitable number vehicles within the geographic area. Further, the threshold may be a number of the vehicles or may be a total value (e.g., estimated dollar value) of the vehicles. Further, the process 70 may consider other assets, such as the number and/or the total value of the vehicles, user devices, buildings, and so forth.

The process 70 may continue to process the data received from the vehicles and/or from other sources (e.g., building systems), and the process 70 may assess whether the data indicate occurrence of an event in the geographic area (block 78). If the data does not indicate occurrence of an event in the geographic area, the process 70 may continue to monitor the number of vehicles in the geographic area and/or to control the vehicles in the coordinated manner to carry out the monitoring program.

However, if the data indicates occurrence of an event in the geographic area, the process 70 may continue to provide one or more appropriate responses. For example, the computing system may instruct some or all of the vehicles, the building systems, and/or the user devices in the geographic area (e.g., qualified vehicles and/or other systems that are part of the vehicle network system) to provide alerts (e.g., lights, horns, notifications) (block 80). Additionally or alternatively, the computing system may instruct some of all of the vehicles, the building systems, and/or the user devices in the geographic area (e.g., qualified vehicles and/or other systems that are part of the vehicle network system) to collect data in the geographic area (e.g., via sensors) (block 82). Additionally or alternatively, the computing system may instruct launch of one or more unmanned aerial vehicles to move and/or collect data in the geographic area (e.g., via sensors) (block 84). It should be appreciated that the one or more unmanned aerial vehicles may also be instructed to provide the alerts (e.g., lights, horns).

In this way, the process 70 may enable groups of vehicles and/or other systems to operate as monitoring teams to patrol geographic areas, which may include fixed and/or dynamic geographic areas. The users that participate in the vehicle network systems may receive certain benefits, including certain discounts.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. It should be appreciated that any of the features shown or described herein, such as with reference to FIGS. 1-4, may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A vehicle network system, comprising:

a processing system comprising one or more processors; and a memory storing instructions executable by the processing system to cause the processing system to:

identify presence of a first vehicle in a geographic area;

identify a number of assets in the geographic area, wherein the assets comprise the first vehicle;

in response to the number of the assets in the geographic area exceeding a threshold, control the first vehicle to autonomously move through the geographic area to monitor for occurrence of events in the geographic area; and in response to the number of the assets in the geographic area subsequently falling below the threshold, control the first vehicle to autonomously transition to a stationary parked position.

2. The vehicle network system of claim 1, wherein instructions are executable by the processing system to cause the processing system to:

identify presence of a second vehicle in the geographic area, wherein the assets comprise the second vehicle; and in response to the number of the assets in the geographic area exceeding the threshold, control the first vehicle and the second vehicle to autonomously move through the geographic area in a coordinated manner to monitor for occurrence of events in the geographic area.

3. The vehicle network system of claim 2, wherein the instructions are executable by the processing system to cause the processing system to control the first vehicle and the second vehicle to take turns to autonomously move through the geographic area in the coordinated manner to monitor for occurrence of events in the geographic area.

4. The vehicle network system of claim 1, wherein the first vehicle is registered to participate in the vehicle network system.

5. The vehicle network system of claim 1, wherein the assets comprise vehicles insured by an insurance company, buildings insured by the insurance company, or both.

6. The vehicle network system of claim 1, wherein the geographic area is a parking lot or a neighborhood.

7. The vehicle network system of claim 1, wherein the instructions are executable by the processing system to cause the processing system to:

in response to detecting an event in the geographic area, instruct a first alert system of the first vehicle to provide an alert.

8. The vehicle network system of claim 7, wherein the event comprises a break-in at the first vehicle, and the instructions are executable by the processing system to cause the processing system to:

in response to detecting the break-in at the first vehicle, instruct at least one alert system of at least one additional vehicle to provide at least one additional alert, wherein the assets comprise the at least one additional vehicle.

9. The vehicle network system of claim 1, wherein the instructions are executable by the processing system to cause the processing system to identify the presence of the first vehicle in the geographic area based on global position coordinates received from the first vehicle.

10. The vehicle network system of claim 1, wherein the instructions are executable by the processing system to cause the processing system to control the first vehicle to autonomously move through the geographic area toward a location of an event in the geographic area in response to occurrence of the event in the geographic area.

11. A vehicle network system, comprising:

a processing system comprising one or more processors; and a memory storing instructions executable by the processing system to cause the processing system to:

identify a cluster of a plurality of assets;

generate a dynamic boundary that defines a dynamic geographic area for the cluster of the plurality of assets;

dynamically update the dynamic boundary that defines the dynamic geographic area in response to a change to the cluster of the plurality of assets due to movement of one or more assets of the plurality of assets;

identify presence of a first vehicle and a second vehicle in the dynamic geographic area, wherein the assets comprise the first vehicle and the second vehicle;

control the first vehicle and the second vehicle to autonomously move through the dynamic geographic area to provide security patrol services to the dynamic geographic area based on a total monetary value of the cluster of the plurality of assets being above a threshold; and in response to detecting an event in the dynamic geographic area, instruct a first alert system of the first vehicle, a second alert system of the second vehicle, or both to provide an alert.

12. The vehicle network system of claim 11, wherein the event comprises a break-in at the first vehicle, and the instructions are executable by the processing system to cause the processing system to:

in response to detecting the break-in at the first vehicle, instruct the second alert system of the second vehicle to provide the alert.

13. The vehicle network system of claim 11, wherein the event comprises a weather event, a crime event, a vehicle crash event, a fire event, a smoke event, a loud sound, a respective presence of an unexpected individual, a respective presence of an unexpected vehicle, or any combination thereof.

14. The vehicle network system of claim 11, wherein the event occurs at a building within the dynamic geographic area.

15. The vehicle network system of claim 11, wherein the alert comprises emitting light from a light emitter of the second vehicle, emitting a sound from a speaker of the second vehicle, or both.

16. The vehicle network system of claim 11, wherein the instructions are executable by the processing system to cause the processing system to:

identify a number of assets in the dynamic geographic area; and in response to the number of assets in the geographic area exceeding a threshold, control the first vehicle and the second vehicle to autonomously move through the dynamic geographic area to provide the security patrol services to the dynamic geographic area.

17. A method of operating a vehicle network system, the method comprising:

identifying, using one or more processors, presence of a first vehicle in a geographic area;

identifying, using the one or more processors, a total estimated monetary value of assets in the geographic area, wherein the assets comprise the first vehicle; and instructing, using the one or more processors, the first vehicle to autonomously move through the geographic area, in response to the total estimated monetary value of the assets in the geographic area exceeding a threshold.

18. The method of claim 17, comprising:

identifying, using the one or more processors, presence of a second vehicle in the geographic area wherein the assets comprise the second vehicle; and instructing, using the one or more processors, the first vehicle and the second vehicle to autonomously move through the geographic area in a coordinated manner in response to the total estimated monetary value of the assets in the geographic area exceeding the threshold.

19. The method of claim 18, comprising instructing, using the one or more processors, a first alert system of the first vehicle to provide an alert in response to detecting an event in the geographic area.

* * * * *